US009971388B2

(12) United States Patent
Trieb et al.

(10) Patent No.: US 9,971,388 B2
(45) Date of Patent: May 15, 2018

(54) ENERGY MANAGEMENT UNIT WITH DIAGNOSTIC CAPABILITIES

(75) Inventors: Gunther Trieb, Winnetka, IL (US); Elizabeth Owens, Winnetka, IL (US); Jaime Andres Borras, Miramar, FL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 916 days.

(21) Appl. No.: 13/248,155

(22) Filed: Sep. 29, 2011

(65) Prior Publication Data

US 2012/0259476 A1    Oct. 11, 2012

Related U.S. Application Data

(60) Provisional application No. 61/387,879, filed on Sep. 29, 2010.

(51) Int. Cl.
*G06F 1/28* (2006.01)

(52) U.S. Cl.
CPC ...................... *G06F 1/28* (2013.01)

(58) Field of Classification Search
CPC ..... H02J 3/14; H02J 13/0075; Y02B 70/3266; Y02B 70/3225; Y02B 90/2653; Y04S 20/242; Y04S 20/222; Y04S 40/126; H04R 29/00; G06F 1/26; G05F 3/02
USPC ......................................................... 700/298
See application file for complete search history.

(56) References Cited

U.S. PATENT DOCUMENTS

| | | | | |
|---|---|---|---|---|
| 4,192,451 A | * | 3/1980 | Swerling | G01R 31/31935 714/28 |
| 5,915,026 A | * | 6/1999 | Mankovitz | 713/168 |
| 6,453,687 B2 | * | 9/2002 | Sharood | G05B 19/00 62/127 |
| 7,693,670 B2 | * | 4/2010 | Durling | G01D 4/008 700/291 |
| 7,778,734 B2 | * | 8/2010 | Oswald et al. | 700/276 |
| 8,174,381 B2 | * | 5/2012 | Imes et al. | 340/539.23 |
| 8,386,082 B2 | * | 2/2013 | Oswald | 700/276 |
| 8,600,562 B2 | * | 12/2013 | Oswald | 700/278 |
| 2004/0001553 A1 | * | 1/2004 | Steentra et al. | 375/260 |
| 2005/0171645 A1 | * | 8/2005 | Oswald et al. | 700/276 |
| 2006/0111857 A1 | * | 5/2006 | Shah et al. | 702/85 |
| 2007/0091800 A1 | * | 4/2007 | Corcoran | H04B 3/542 370/230 |
| 2011/0035060 A1 | * | 2/2011 | Oswald | 700/278 |
| 2011/0037455 A1 | * | 2/2011 | Oren et al. | 324/103 R |
| 2011/0125329 A1 | * | 5/2011 | Oswald | 700/276 |
| 2011/0173542 A1 | * | 7/2011 | Imes et al. | 715/735 |
| 2011/0202227 A1 | * | 8/2011 | Zhang | B60W 50/0097 701/31.4 |

* cited by examiner

*Primary Examiner* — Christopher E Everett
(74) *Attorney, Agent, or Firm* — McAndrews, Held & Malloy, Ltd.

(57) ABSTRACT

An example energy management unit (EMU) with diagnostic capabilities is provided. The EMU with diagnostic capabilities can identify a potential failure or end-of-life condition by detecting a higher power consumption, an abnormal power waveform or by receiving a signal from an appliance or piece of equipment itself generated by the appliance's or piece of equipment's self diagnostic system. The EMU can be incorporated into a system that permits various power consumption and time-current information to be transmitted to a variety of devices and parties via a communication.

22 Claims, 5 Drawing Sheets

ENERGY MANAGEMENT UNIT WITH DIAGNOSTIC CAPABILITIES

CROSS REFERENCE TO RELATED APPLICATION

This application is a non-provisional application claiming priority from U.S. Provisional Application Ser. No. 61/387,879, filed Sep. 29, 2010, entitled "Energy Management Unit with Diagnostic Capabilities," and incorporated herein by reference in its entirety.

FIELD OF THE DISCLOSURE

The present disclosure generally relates to identifying a potential malfunction, end-of-life warning, or diagnostic information and correcting failure modes for appliances and equipments when connected to an Energy Management Unit (EMU), and more particularly to an EMU with diagnostic capabilities.

BACKGROUND

The current "smart grid" initiative using "smart meters" is driving appliance and equipment manufacturers to provide connectivity that can respond to and control the peak energy loads in residential and business settings. Smart meters raise consumer awareness of the cost and impact of electric devices. Such devices typically utilize ZigBee® communication protocol for wireless home area networks relying upon different energy profiles to deliver both energy and other information. As ZigBee® is a relatively low data rate wireless protocol that does not support streaming of content or downloads for remote software updates and applications, WiFi is used complementarily.

For instance, ZigBee is a wireless language connecting different devices to work together. Available ZigBee networks provide a suggested standard for deploying switches, sensors, and controllers using harvested energy in residential, commercial and, industrial environments. The ZigBee networks include a physical radio using IEEE 802.15.4 standard radios operating in a 2.4 GHz band. The proposed ZigBee standard seeks to provide interference avoidance, mesh networking, security, certification, and an open standard.

While smart meters oftentimes assist in the easing of data collection regarding overall dwelling power usage, and may provide empirical data regarding the overall usage of power by a metered building, the smart meter fails to provide any services to monitor and or predict power consumption, potential malfunction, and/or end-of life of an individual power consumer within the dwelling itself.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure described herein addresses the problem of identifying a potential malfunction or end-of-life for an appliance or equipment when it is connected to an electrical outlet provided on an energy management unit (EMU). The disclosed is further able to combine the diagnostic capabilities of the appliance or equipment with the EMU toward informing the consumer when an appliance or piece of equipment is reaching the end of its life.

In operation, the EMU can notify a service department of a potential appliance or equipment failure before a failure actually occurs. Moreover, the EMU can inform the user when an associated appliance or piece of equipment is reaching the end of its useful life and permit the consumer to avoid the additional inefficiencies associated with appliance or equipment break-downs while also suggesting a replacement appliance or equipment. The EMU disclosed herein can be offered by a service contractor to consumers on a contract or subscription basis, wherein the service contractors may provide ongoing service to monitor, collect, host and analyze appliance or equipment performance, warning signs and energy consumption data. The EMU further facilitates the ability to offer consumers cost saving recommendations and usage optimization.

In addition to monitoring and reporting the energy usage, the EMU may function to identify a potential failure or end-of-life condition by detecting a higher power consumption, an abnormal power waveform or by receiving a signal from the appliance or equipment itself generated by the appliance's or piece of equipment's self diagnostic system.

DETAILED DESCRIPTION

The following description of example methods and apparatus is not intended to limit the scope of the description to the precise form or forms detailed herein. Instead, the following description is intended to be illustrative so that others may follow its teachings.

Figure 1:
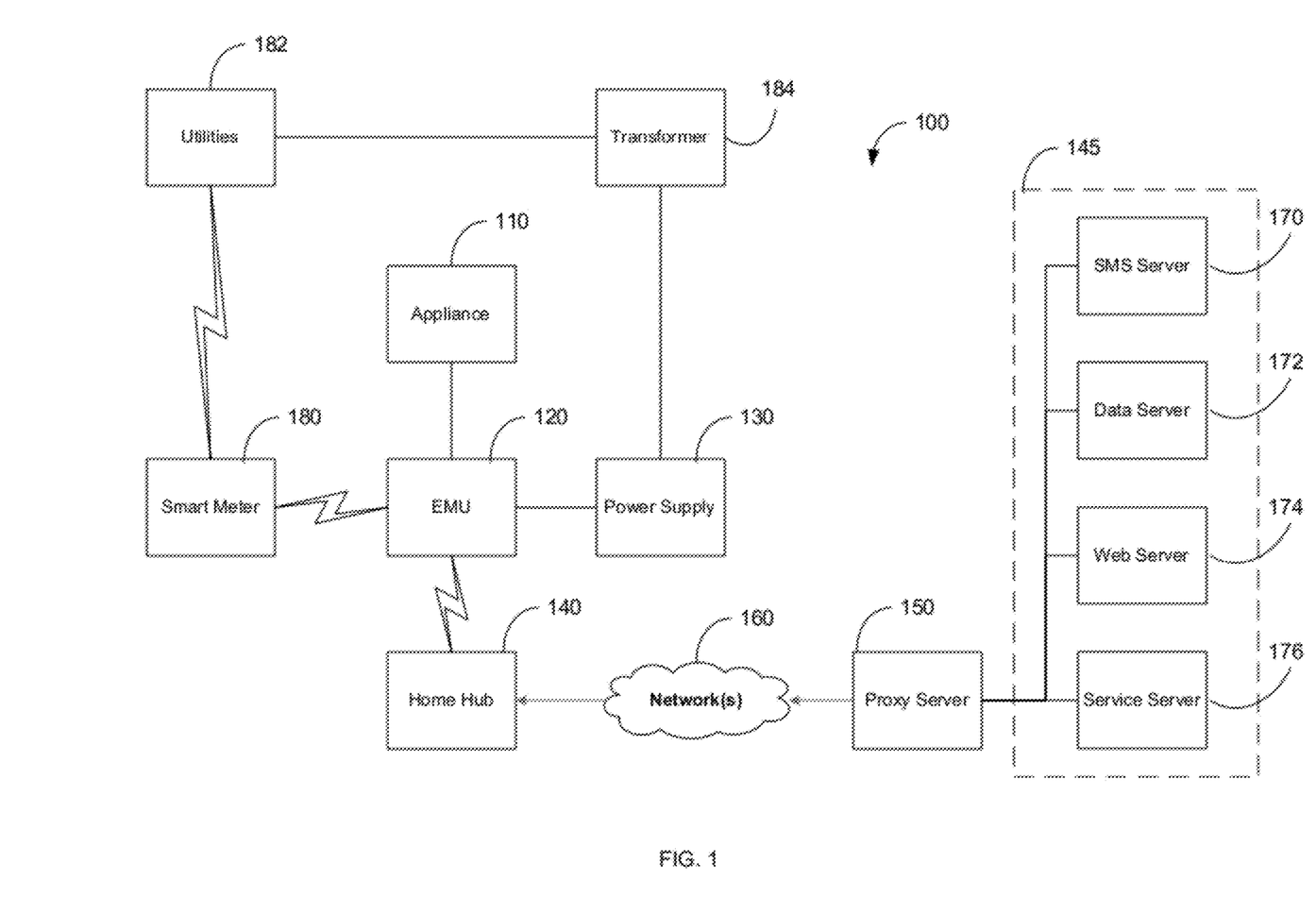
FIG. 1 is a system diagram of an example EMU with diagnostic capabilities connected to an appliance and the communication of data therefrom.

FIG. 1 illustrates an example Energy Management Unit (EMU) system 100 comprising an EMU 120 connected device such as an appliance 110 and the communication of data therefrom. The present disclosure takes advantage of a smart grid energy monitoring device or EMU 120, including, for example, one with a wall-plug form factor or any other suitable device. The example EMU 120 plugs directly into an ordinary 120 volt, 60 Hz electrical socket 130. It is further contemplated that the EMU 120 may be adapted to plug and/or electrically couple into any suitable power supply including for instance an electrical socket of any suitable voltage and/or prong geometry. It will also be appreciated that the EMU 120 may be power via any suitable electrical supply including, for example, direct AC and/or DC supplies. In other example, the appliance 110 may be any piece of equipment suitably coupled to the EMU 120, such as, for example, a washing machine, a dryer, a refrigerator, a television, a coffee maker, etc. It will be understood that there are many other appliances and/or pieces of equipment that may be used with the EMU 120 without departing from the spirit of the present disclosure.

Figure 2:
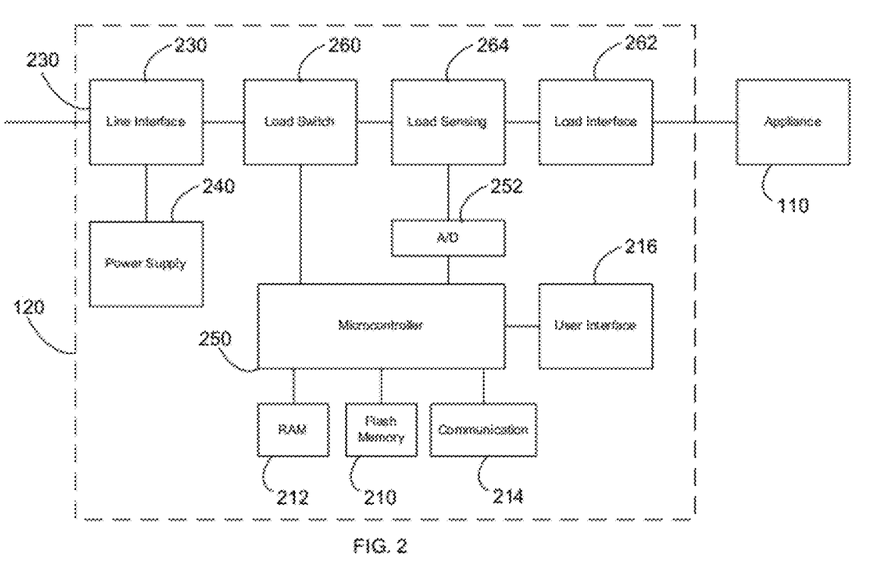
FIG. 2 is a component diagram of the example EMU of FIG. 1.

The example EMU 120 is configured to measure the energy usage of the connected appliance 110 or other piece of equipment. The EMU 120 is further configured to store the energy usage data in its own memory. For example, as illustrated in FIG. 2, the EMU 120 includes a flash memory 210 and/or a random access memory (RAM) 212 to store the collected energy use data. The EMU 120 may use other types of memory in addition to, or in lieu of, flash memory 210 and RAM 212 to store the energy use data. The energy use data is, in turn, transmitted to a "home hub" 140 (see FIG. 1) such as, for example, a personal computer (PC), terminal, router, smartphone, tablet, or other suitable device) via a communicator 214 such as a wireless connection using the local area network with WiFi, ZigBee®, Bluetooth, infrared, or the like. While the connection between the EMU 120 and the home hub 140 is illustrated as being a communicator 214, a person of ordinary skill in the art will recognize that the data connection may be any suitable connection including a wired connection as desired. Software, firmware, and/or hardware executing and/or contained within the home hub 140 processes the transmitted energy use data generated by the connected appliance 110 and EMU 120 and is adapted to at least one of displays the data on an integrated and/or external display having a user interface 216, and/or transmit the data to a remote computer center 145, such as a company-operated proxy server 150 or cloud service 160 through an Internet, cellular, wireless, wired, LAN, tethered, and/or any other suitable connection.

In this example, the transmitted energy use data is segregated into different services and/or servers as shown in FIG. 1, including an SMS server 170, a data server 172, a web server 174, or a service server 176. While the energy use data is segregated in the illustrated example, the data need not be divided or alternatively may be divided even further as desired. In at least one example, the operator of the remote computer center 145 may offer to a consumer on a contract and/or subscription basis, services to monitor, collect, host, and/or otherwise analyze appliance performance, warning signs, and/or energy use data. Thus, the example EMU 120 facilitates the ability for an operator to offer consumers cost saving recommendations and usage optimization.

Referring again to FIG. 1, the home hub 140 may also transmit energy use data to a smart meter 180, via a wireless connection using ZigBee® or the like. In this example, the smart meter 180 is a typical electrical meter that records consumption of electric energy in predefined intervals, such as intervals of an hour or less and communicates consumption information back to a utility company 182 for monitoring and/or billing purposes. Typically, the smart meter 180 enables two-way communication between the meter and a central system. Accordingly, the utility company 182 providing the power to the appliance 110 and/or other equipment via a power line including, for example, a transformer 184, can access the energy use data stored on the smart meter 180 for further review.

As noted above, an example EMU 120 is shown in FIG. 2. The example EMU 120 comprises a line interface 230 which is inductively coupled to the power line to rectify and provide line powered DC voltage 240 to a microcontroller 250, the memories 212, 210, an analog-to-digital (A/D) converter 252, the communicator 214, and the user interface 216. A load switch 260, such as for example, a solid state relay removes or applies power to the coupled appliance 110 through a load interface circuit 262. The example load switch 260 and the example load interface 262 are in series with a load monitoring/sensing circuit 264. The example load monitoring/sensing circuit 264 provides a stepped-down current signal which is within the operating range of the A/D converter 252 for subsequent sampling by the microcontroller 250. As previously described, the communicator 214 periodically transmits energy use data to the home hub 140 via a wireless and/or wired connection using the local area network with WiFi, ZigBee®, or the like. The user interface 216 communicates the status of the EMU 120 and provide at least one user interface element which allows the user to interact with the EMU 120. For instance, the user interface 216 may provide a display on which energy use data and the like are shown to the user. Additionally, the user interface 216 may also provide one or more input user interface elements through which the user can toggle interact with the EMU 120 to retrieve further information regarding energy use, to on and/or off various appliances including the appliance 110, to customize various features and/or settings of the EMU 120 depending on the particular appliance or piece of equipment connected to the EMU 120, to customize various user preferences, etc.

Figure 3:
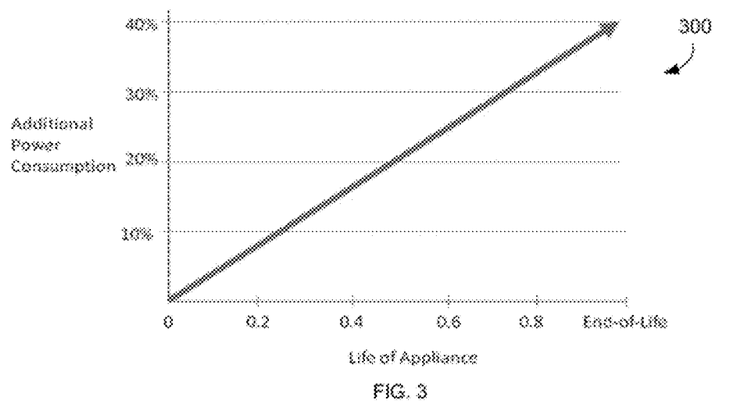
FIG. 3 is a graph showing how additional power consumption changes as an appliance or piece of equipment approaches its end-of-life.

It is known that the power consumption of an appliance typically exceeds the original specified power consumption as the appliance ages. In general, data analyzed/collected by maintenance departments has shown that power consumption may vary by more than forty percent (40%) from the original design as an appliance approaches its end-of-life, depending on the brand, model, usage, and/or other factors. In addition, an aging appliance's or piece of equipment's repair, parts, and maintenance costs oftentimes add up over time and typically justify replacement of an aging appliance or piece of equipment. Current and time characteristics of appliance or equipment failure and end-of-life, known as time-current envelopes can be quantified. The time-current envelopes are typically measurable, often repeatable, and thus predictable. FIG. 3 illustrates a sample graphical representation 300 depicting how the remaining life of an appliance or piece of equipment may be calculated based on the additional power consumption over time, as compared to its original state.

Figure 4:
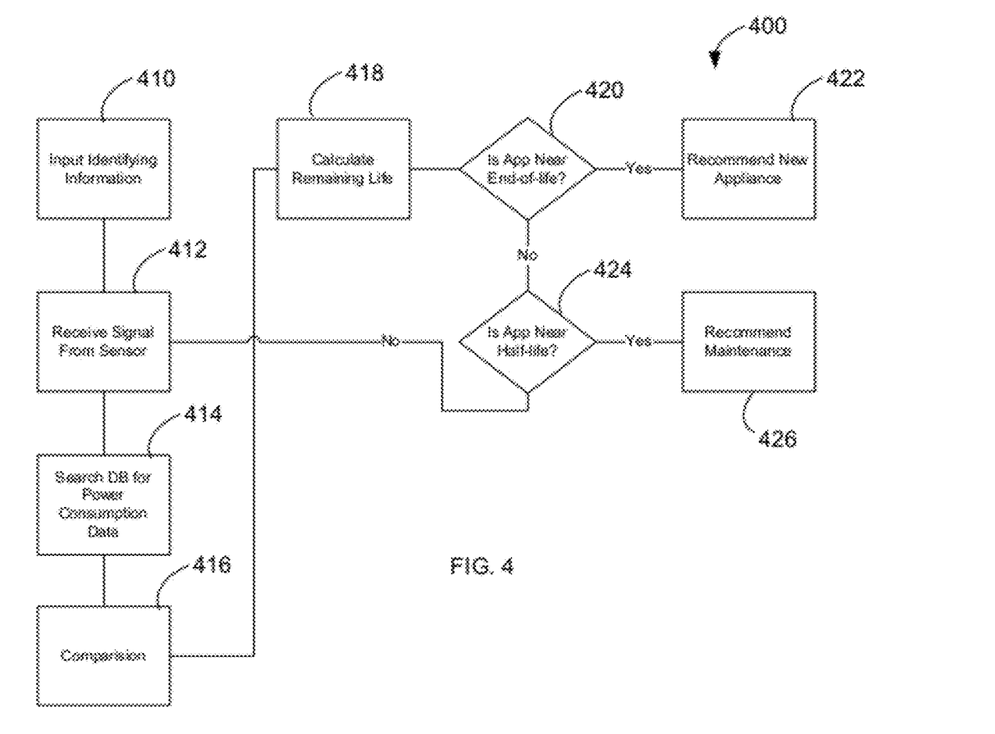
FIG. 4 is a flow chart describing an algorithm to calculate an appliance's or piece of equipment's end-of-life.

Thus, one aspect of the EMU 120 is that it may function to identify a potential failure, malfunction, inefficiency, and/or end-of-life condition by detecting a higher than usual power consumption. A sample algorithm system 400 to calculate the end-of-life and/or potential failure of the appliance 110 is shown in FIG. 4 as a flowchart. In this example, identifying information, such as, for example, the brand and/or model number of the appliance 110 connected to the EMU 120 is input into the home hub 140 and/or the EMU 120 at block 410. Periodically, the home hub 140 will detect a signal transmitted by the communicator 214 of the EMU 120 at block 412. The signal transmitted by the EMU 120 typically contains information regarding the power consumption collected by the load sensor 264 of the EMU 120. Once the information is detected and received, the home hub 140 stores the power consumption information either temporarily and/or permanently as desired. The home hub 140 may then search a local and/or remote database containing information regarding original power consumption and respective degradation curves for older appliances of the same or similar brand and model as that originally input and selects the closest match at block 414. In at least one example, the home hub 140 is provided with the ability to update and/or modify the power consumption curves for various appliance types as necessary. Furthermore, the home hub 140 may be provided with the ability to query a remote database through the network 160 if necessary. Once the home hub 140 compares the stored power consumption data to the selected original power consumption and respective degradation curves at block 416, the system 400 may calculate an estimated end-of-life for the appliance at block 418. Alternatively, if the system 400 determines that the actual power consumption varies widely from the original power consumer and degradation curve, the system 400 may identify the appliance as potentially having failed in at least one of its internal components, and may so identify the appliance 100 to the user.

Based upon the calculated estimated end-of-life for the appliance 110, the system 400 inquire whether the appliance is near its predicted end-of-life at block 420 and may recommend a new appliance at block 422. If the appliance is not calculated a being near its end-of-life, the system 400 may inquire whether the appliance is near a predetermined and/or suggest maintenance life span, such as for example, near the appliance's predicted half-life at block 424. If the system 400 determines that the end-of-life is sufficiently close to a maintenance life span, the system 400 may recommend a maintenance check at block 426. Otherwise, the home hub 140 may proceed to wait for the next detected power consumption data transmission at block 428. In this manner, the system 400 can make a recommendation to the consumer that the appliance 110 is near the end of its life, that the appliance is malfunctioning, that a maintenance check is in order, and/or that the appliance or piece of equipment is operating normally.

Moreover, as noted above, the home hub 140 may transmit this power consumption data and the results of the end-of-life analysis to the remote computer center 145. The remote computer center 145 may be operated by a service contractor wherein the service contractor provides ongoing service to monitor, collect, host and analyze appliance performance, warning signs, and energy consumption data and make recommendations to the consumer based on such information.

Figure 5:
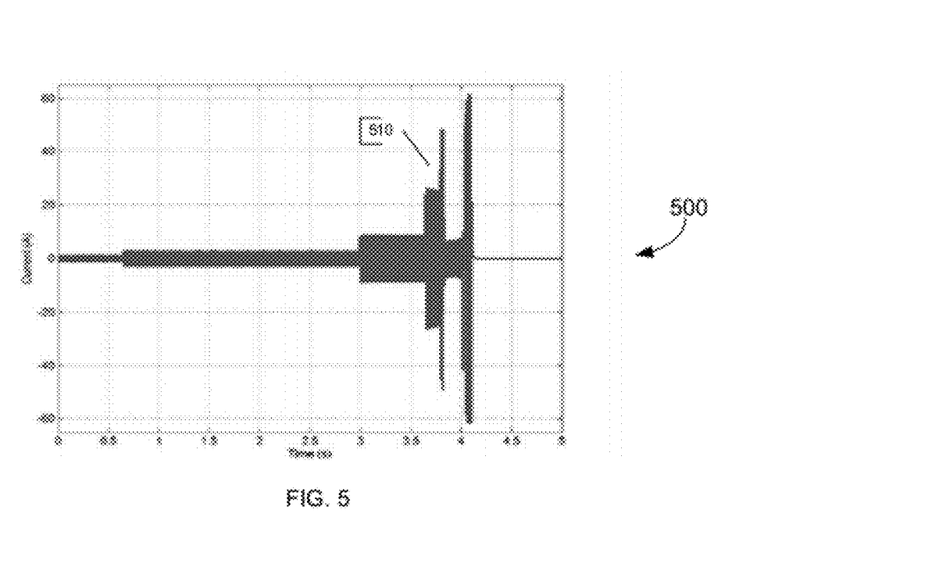
FIG. 5 is a graphical representation of a possible time-current waveform of a failing fan motor.

In another example of the present disclosure, the EMU 140 utilizes a waveform comparison algorithm to monitor the appliance's time-current envelope to predict a particular failure mode of the appliance 110. In this example, a time-current envelope contains information describing how an appliance's electrical current changes over time. A time-current envelope has a corresponding time-current waveform. The microcontroller 250 may comprise an executable waveform comparison algorithm that compares the appliance's time-current envelope to a database of failure time-current envelopes stored within at least one of the memories 210, 212, and/or stored at in a separate device and in communication with the EMU 120. Failure time-current envelopes may be supplied by the manufacturer or the manufacturer's maintenance department and may be specifically associated with, and hence capable of predicting, the type of subsequent failure mode of a particular appliance or piece of equipment often at the component level. An example of a time-current waveform 500 experienced by a fan motor during failure is illustrated in FIG. 5.

In this example, arcing in the motor windings produces a stair-stepping increase 510 in an electrical current, ultimately opening the circuit with an arc of greater than 60 Amperes. For many appliances or pieces of equipment, there are a number of example characteristics that can be detected, including, but not limited to: a short arc durations of 8 ms (half-cycle 60 Hz); a rapid changes in currents and impedances; a current escalation through a short sequence of mini-arcs; and/or a rapid stair-stepping of current in motor windings.

Figure 6:
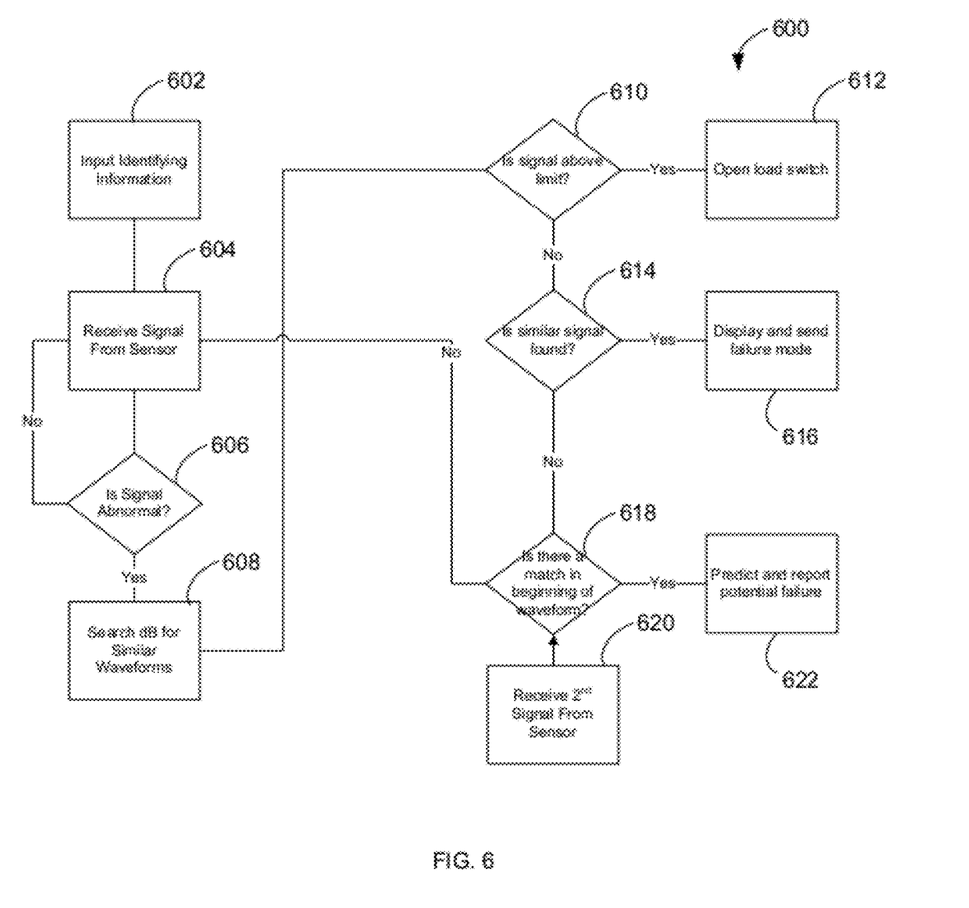
FIG. 6 is a flow chart describing an algorithm that uses time-current waveforms to assess the possibility of future failure or to arrest an in-progress failure of an appliance or piece of equipment.

One such waveform comparison process 600 suitable for use by the microcontroller 250 and suitable for assessing the likelihood and/or imminence of an appliance failure is shown in FIG. 6, which incorporates limits as guidelines in case an abnormal current level occurs. In the example process 600, identifying information, such as for example, the brand and/or model number of the appliance 110 connected to the EMU 120 is input into software loaded onto the home hub 140 at block 602. Similar to the previous system 400, the home hub 140 will periodically detect the signal transmitted by the communicator 214 of the EMU 120 at block 604. The received signal contains and/or provides sufficient information required to recreate the appliance's time-current envelope collected by the load sensor 264 of the EMU 120. At a block 606, the home hub 120 temporarily and/or permanently stores the time-current envelope and determines whether the waveform corresponding to the appliance's time-current envelope is normal or abnormal. If the waveform is normal, then the process returns to clock 604 such that the home hub can detect another signal emitted by the EMU 120.

If the waveform is abnormal, however, at block 608 the home hub 120 searches a locally or remotely stored database containing failure time-current envelopes and their corresponding waveforms and other system limits, such as a maximum allowable current. Upon comparison of the appliance's time-current envelope to the system limits identified by the earlier database search, the process 600 can determine the proper course of actions. For instance, if any system limits are exceeded based on the appliance's time-current envelope (block 610), the EMU 120 can execute an over-limit process such as a rapid power interruption and/or an intervention to arrest a failure while in progress at block 612. In this instance, the EMU 120 may disconnect the appliance 110 from the power source in any suitable manner including, for example by opening the load switch, hence avoiding a potential fire and/or further damage to the appliance 110 and/or surrounding structures.

Alternatively, if the process 600 determines that the appliance 110 is operating within the allowable limits, the process 600 can further identify a failure time-current envelope and corresponding waveform or partial waveform similar to the waveform corresponding to the appliance's time-current envelope at block 614. In this instance, if a similar wave form is found, the EMU 120 and/or the home hub 140 will display an associated failure mode or potential failure mode to the user at block 616. Additionally, the home hub 140 can similarly transmit this displayed failure information to the remote computer center 145, for further processing as desired. If, however, the process 600 fails to identify a similar waveform or partial waveform, the process 600 monitors the transmissions from the EMU 120 and receives another signal emitted by the EMU 120 (block 620). The received second EMU signal is compared to the first signal at block 618, and if there is a change in the signal, the process 600 may report a potential failure to the user at block 622. In this way, the process 600 will thus provide the ability for the process 600 to look ahead and predict a potential failure mode before it occurs.

Figure 7:
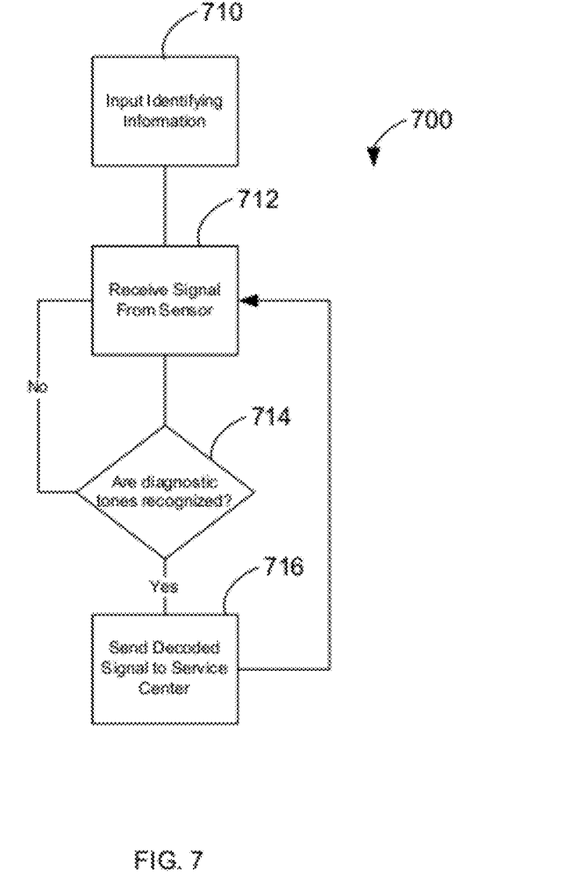
FIG. 7 is a flow chart describing an algorithm that uses diagnostic tone signals to assess the possibility of future failure or to arrest an in-progress failure of an appliance or piece of equipment.

In yet another example of the present disclosure, the example appliance 110 may incorporate a self diagnostic systems that can identify their own failure modes (i.e., without requiring the appliance to transmits to a centralized EMU 120 and/or the home hub 140) and can communicate the failure mode to the EMU 120 and/or the home hub 140 via any suitable means. In one example, the transmission may be via audible tones detectable by the EMU 120 and/or the home hub 140, allowing a tone detection process 700 to identify the failure mode as shown in FIG. 7. In this example, by using the audible tones to modulate the power line source, the EMU 120 will be able to detect the tone sequence and transmit it to the home hub 140 which then can be transmitted to a service server. For instance, as with the previous processes, the process 700 allows the identification of the appliance 110 at block 710. The self diagnostic information may be transmitted over a number of periodic frames (e.g. four) with built in error correction and redundancy. At block 712, the EMU 120 detects the signal and determines whether the signal was a single (i.e., mistakenly) transmission, or whether the signal is a true transmission due to the periodic nature of its transmission at block 714. At block 716, the EMU 120, upon detecting a true failure mode transmission, the EMU 120 may transmit its own signal to the home hub 140 and/or the service provider 145. Additionally, in at least one example, the EMU 120 and/or the home hub 140 may transmit its own signal back to the appliance 110, instructing the appliance 110 how to overcome the failure such as for instance, by ceasing to emit the audible tone that has already been detected, interpreted, and transmitted by the EMU 120, and/or by taking functional steps such as shutting down, resetting, and/or otherwise attempting to correct the failure mode of the appliance 110.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A non-transitory computer-readable media having stored thereon computer executable instructions for operating an energy management unit (EMU), wherein the instructions perform steps for detecting a potential malfunction, end-of-life warning or diagnostic information and correcting failure modes for an electrical device connected to and receiving power for operation from the EMU, the steps comprising:

hosting a database of information representative of electrical current flow waveforms for each of a plurality of modes of operation for each of a plurality of electrical devices having corresponding identifying information, the plurality of modes of operation comprising information representative of both a normal mode of operation and one or more abnormal modes of operation;

providing a user interface comprising user interface elements for allowing a user to input identifying information for the electrical device connected to the EMU;

receiving the identifying information for the electrical device connected to the EMU, from the user interface;

receiving energy use data representative of an electrical current flow waveform for the electrical device connected to the EMU, collected by the EMU;

matching the received identifying information for the electrical device connected to the EMU with the identifying information for the plurality of electrical devices in the database to identify the waveform information corresponding to the plurality of modes of operation for the electrical device connected to the EMU;

analyzing the energy use data representative of the electrical current flow waveform for the electrical device connected to the EMU to identify one of the plurality of modes of operation;

comparing a power consumption of the electrical device connected to the EMU with a power consumption model for that type of electrical device, wherein the power consumption for that type of electrical device increases over a lifetime of that type of electrical device according to the power consumption model;

interrupting electrical power to the electrical device connected to the EMU, if the analysis identifies an abnormal mode of operation of the electrical device connected to the EMU; and transmitting the energy use data from the EMU to storage in a power utility electric meter that records consumption of electric energy and that is configured to enable access to the recorded consumption information and the energy use data by a power utility company.

2. The non-transitory computer-readable media as recited in claim 1, wherein the database of information comprises original power consumption and respective degradation curves and the energy use data comprises power consumption information.

3. The non-transitory computer-readable media as recited in claim 2, wherein the power consumption information collected by the EMU is transmitted via a wireless network connection using a local area network.

4. The non-transitory computer-readable media as recited in claim 1, wherein the identifying information comprises the brand and model for the electrical device connected to the EMU.

5. The non-transitory computer-readable media as recited in claim 1, wherein analyzing the energy use data comprises calculating the end-of-life for the device.

6. The non-transitory computer-readable media as recited in claim 1, wherein providing the results of the analysis comprises providing the user a status of the operation of the electrical device connected to the EMU.

7. The non-transitory computer-readable media as recited in claim 1, wherein the steps comprise:

providing the results of the analysis of the energy use data by transmitting the results of the analysis to a remote computer center through an Internet connection.

8. The non-transitory computer-readable media as recited in claim 1, wherein the database of information comprises one or more failure time-current envelopes and their corresponding waveforms and the energy use data comprises a time-current envelope associated with the electrical device connected to the EMU, and comprising:

comparing the time-current envelope associated with the electrical device connected to the EMU with the one or more failure time-current envelopes to predict a type of failure mode of the electrical device connected to the EMU.

9. The non-transitory computer-readable media as recited in claim 8, wherein the time-current envelope of the electrical device connected to the EMU that is collected by the EMU is transmitted via a wireless network connection using a local area network.

10. The non-transitory computer-readable media as recited in claim 9, wherein the identifying information comprises the brand and model for the electrical device connected to the EMU.

11. The non-transitory computer-readable media as recited in claim 8, wherein analyzing the energy use data comprises analyzing the time-current envelope of the electrical device connect to the EMU by determining whether the electrical device connected to the EMU is at least one of operating within normal limits, is likely to fail, or is currently failing.

12. The non-transitory computer-readable media as recited in claim 8, wherein the steps comprise providing the results of the analysis by providing the user a status of the operation of the electrical device connected to the EMU.

13. The non-transitory computer-readable media as recited in claim 8, wherein the steps comprise providing the results of the analysis by transmitting the results of the analysis to a remote computer center through an Internet connection.

14. The non-transitory computer-readable media as recited in claim 1, wherein the steps comprise determining a remaining lifetime of the electrical device connected to the EMU based on the comparison of the power consumption of the electrical device connected to the EMU with the power consumption as set forth in the power consumption model for that type of electrical device, wherein the power consumption for that type of electrical device increases over the lifetime of that type of electrical device according to the power consumption model.

15. A non-transitory computer-readable media having stored thereon computer executable instructions for operating an EMU, wherein the instructions perform steps for detecting a potential malfunction, end-of-life warning or diagnostic information and correcting failure modes for an appliance or piece of equipment connected to and receiving power for operation from the EMU, the steps comprising:
    hosting a database of information representative of energy use data for each of a plurality of modes of operation for each of a plurality of appliances or pieces of equipment having corresponding identifying information, the plurality of modes of operation comprising information representative of both a normal mode of operation and one or more abnormal modes of operation of each appliance or piece of equipment;
    providing a user interface comprising user interface elements for allowing a user to input identifying information for the appliance or piece of equipment connected to the EMU;
    receiving the identifying information for the appliance or piece of equipment connected to the EMU, from the user interface;
    receiving energy use data for the appliance or piece of equipment connected to the EMU, collected by the EMU;
    analyzing the energy use data for the appliance or piece of equipment connected to the EMU;
    identifying one of the plurality of modes of operation of the appliance or piece of equipment connected to the EMU as a current mode of operation of the appliance or piece of equipment connected to the EMU, based upon the analysis and the database of information;
    comparing a power consumption of the appliance or piece of equipment connected to the EMU with a lifetime power consumption model for that type of appliance or piece of equipment, wherein the power consumption for that type of appliance or piece of equipment linearly increases as that type of appliance or piece of equipment ages according to the lifetime power consumption model;
    interrupting electrical power to the appliance or piece of equipment connected to the EMU, if the current mode of operation of the appliance or piece of equipment connected to the EMU is an abnormal mode of operation in a portion of the database corresponding to the appliance or piece of equipment connected to the EMU; and
    transmitting the energy use data from the EMU to storage in a power utility electric meter that records consumption of electric energy and that is configured to enable access to the recorded consumption information and the energy use data by a power utility company.

16. The non-transitory computer-readable media as recited in claim 15, wherein the identifying information comprises the brand and model for the appliance or piece of equipment connected to the EMU.

17. The non-transitory computer-readable media as recited in claim 16, wherein the energy use data of the appliance or piece of equipment connected to the EMU that is collected by the EMU comprises diagnostic information for the appliance or piece of equipment connected to the EMU and receiving diagnostic information for the appliance or piece of equipment connected to the EMU collected by the EMU comprises the appliance or piece of equipment emitting an audible tone corresponding to the diagnostic information for the appliance or piece of equipment connected to the EMU, the EMU detecting and interpreting the audible tone, and the EMU transmitting the diagnostic information for the appliance or piece of equipment connected to the EMU for receipt by the computer-readable media.

18. The non-transitory computer-readable media as recited in claim 17, wherein the audible tone is transmitted from the appliance or piece of equipment connected to the EMU, to the EMU via an electrical power connection of the appliance or piece of equipment connected to the EMU.

19. The non-transitory computer-readable media as recited in claim 15, wherein an audible signal representative of self-diagnostic information identifying a failure mode of the appliance or piece of equipment connect to the EMU is received from the appliance or piece of equipment connected to the EMU, by the EMU.

20. The non-transitory computer readable media as recited in claim 19, wherein the EMU transmits a signal representative of instructions for how to overcome the failure mode to the appliance or piece of equipment that transmitted the audible signal.

21. The non-transitory computer-readable media as recited in claim 15, wherein the database of information comprises one or more failure time-current envelopes and their corresponding waveforms and the energy use data comprises a time-current envelope associated with the appliance or piece of equipment connected to the EMU, and comprising:
    comparing the time-current envelope associated with the appliance or piece of equipment connected to the EMU with the one or more failure time-current envelopes to predict a type of failure mode of the appliance or piece of equipment connected to the EMU, at a component level.

22. The non-transitory computer-readable media as recited in claim 15, wherein the steps comprise providing recommendations for cost savings and usage optimization for the appliance or piece of equipment connected to the EMU based upon the analysis and the database of information.

* * * * *